US008232219B2

(12) United States Patent
Nonaka et al.

(10) Patent No.: US 8,232,219 B2
(45) Date of Patent: Jul. 31, 2012

(54) DIELECTRIC CERAMIC COMPOSITION, AN ELECTRIC COMPONENT AND A MANUFACTURING METHOD THEREOF

(75) Inventors: Tomoaki Nonaka, Tokyo (JP); Tetsuo Takaishi, Tokyo (JP); Kenta Iwasawa, Tokyo (JP); Hiroshi Sasaki, Tokyo (JP)

(73) Assignee: TDK Corporation, Toyko (JP)

( * ) Notice: Subject to any disclaimer, the term of this patent is extended or adjusted under 35 U.S.C. 154(b) by 117 days.

(21) Appl. No.: 12/382,652

(22) Filed: Mar. 20, 2009

(65) Prior Publication Data
US 2009/0246541 A1 Oct. 1, 2009

(30) Foreign Application Priority Data

Mar. 31, 2008 (JP) .................................. 2008-093837
Mar. 9, 2009 (JP) .................................. 2009-055284

(51) Int. Cl.
*C04B 35/48* (2006.01)
*C04B 35/49* (2006.01)
(52) U.S. Cl. ....................... 501/135; 501/136; 361/321.4
(58) Field of Classification Search .................. 501/135, 501/136; 364/321.4
See application file for complete search history.

(56) References Cited

U.S. PATENT DOCUMENTS
6,396,681 B2 * 5/2002 Naito et al. ................ 361/321.4
7,312,172 B2 * 12/2007 Sasaki et al. ................... 501/136
7,820,578 B2 * 10/2010 Takaishi et al. ............... 501/136
2001/0040784 A1 11/2001 Naito et al.
2006/0234853 A1 * 10/2006 Sasaki et al. ................... 501/136
2009/0137381 A1 * 5/2009 Takaishi et al. ............... 501/135

FOREIGN PATENT DOCUMENTS
| CN | 1317459 A | 10/2001 |
| JP | A-2000-169228 | 6/2000 |
| JP | A-2003-212650 | 7/2003 |
| WO | WO 2004/063119 A1 | 7/2004 |

OTHER PUBLICATIONS
Definition of calcination from Wikipedia, Apr. 28, 2011.*

* cited by examiner

*Primary Examiner* — Karl Group
(74) *Attorney, Agent, or Firm* — Oliff & Berridge, PLC

(57) ABSTRACT

The present invention relates to a dielectric ceramic composition comprises a main component including a dielectric oxide having a composition shown by $[(Ca_{1-x}Sr_x)O]_m[(Zr_{1-y-z-\alpha}Ti_yHf_zMn_\alpha)O_2]$, note that, $0.991 \leq m \leq 1.010$, $0 \leq x \leq 1$, $0 \leq y \leq 0.1$, $0 < z \leq 0.02$, $0.002 < \alpha \leq 0.05$), 0.1 to 0.5 parts by mol of $Al_2O_3$ and 0.5 to 5.0 parts by mol of $SiO_2$ with respect to 100 parts by mol of the main component. A purpose of the present invention is to provide a dielectric ceramic composition available to prevent the occurrence of crack even when a dielectric layer is made thin, for example, 2 μm or less, while maintaining various advantageous properties of a dielectric ceramic composition of $[(CaSr)O]_m[(TiZrHf)O_2]$ type.

4 Claims, 1 Drawing Sheet

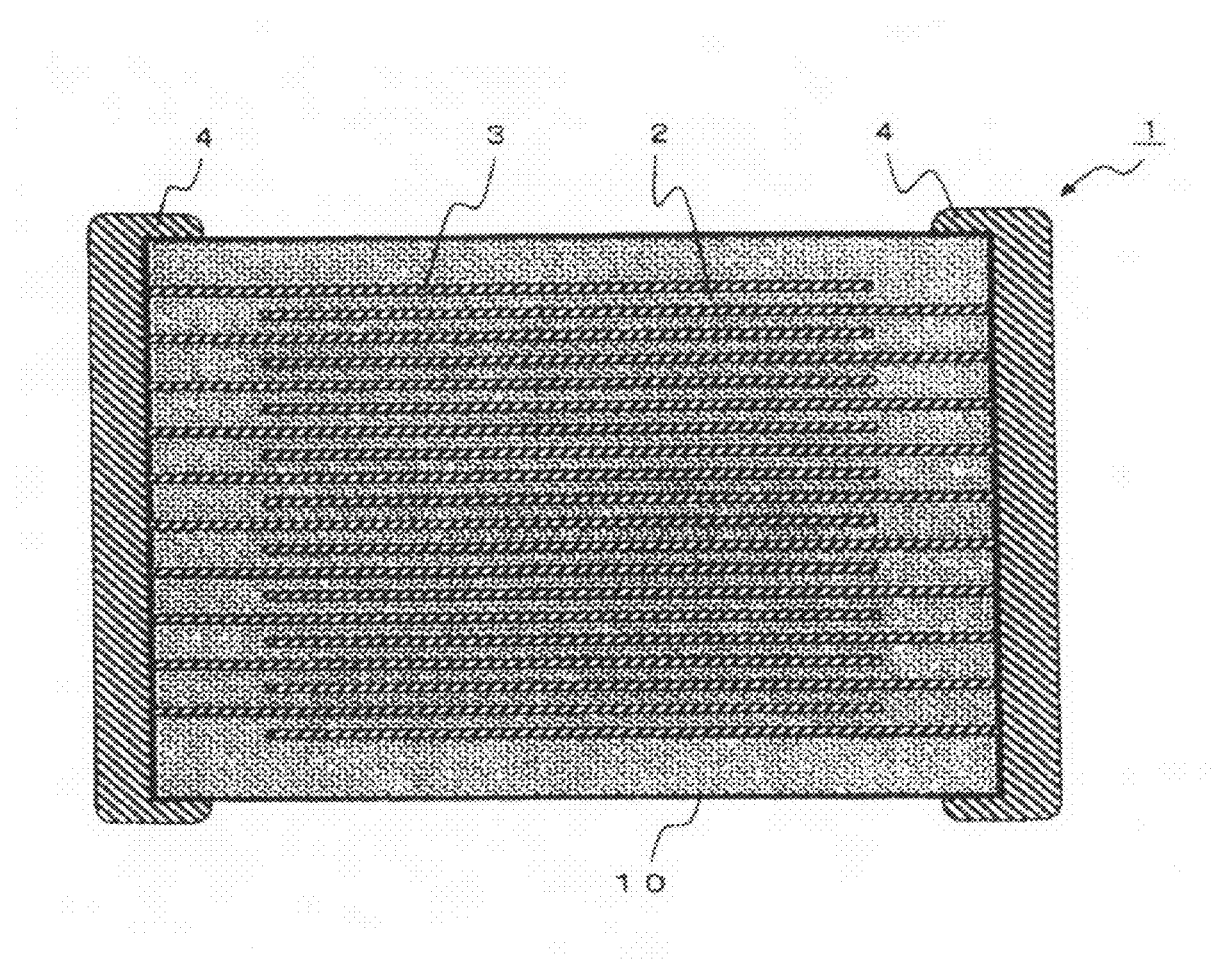

DIELECTRIC CERAMIC COMPOSITION, AN ELECTRIC COMPONENT AND A MANUFACTURING METHOD THEREOF

BACKGROUND OF THE INVENTION

1. Field of the Invention

The present invention relates to a dielectric ceramic composition, an electronic component and manufacturing method thereof, more particularly, for a non-reducing compensating temperature dielectric ceramic composition suitable for an electronic component such as a multilayer ceramic capacitor wherein an internal electrode is a base metal.

2. Description of the Related Art

A multilayer ceramic capacitor is widely used as an electronic component, and large numbers of electronic components are used in one electronic device. Normally, a multilayer ceramic capacitor is produced by stacking an internal electrode layer paste and an external electrode layer paste by the printing method or the sheets method or so and by cofiring thereof.

In the meantime, the dielectric ceramic material used for a conventional multilayer ceramic capacitor has a property that it is reduced when it is fired in a reducing atmosphere and becomes semiconductor. Therefore, as for the internal electrode material, a precious metal such as Pd or so has been used since those do not melt at a temperature in which a dielectric ceramic material is sintered, and also do not oxidize even it is fired under a high oxygen partial pressure in which the dielectric ceramic material does not become a semiconductor.

However, the precious metal such as Pd or so is expensive, thus it becomes a big problem for price reduction of the multilayer ceramic capacitor. Thus, as for the internal electrode material, the use of comparatively inexpensive base metals such as Ni or Ni alloy has become a main stream.

However, in case the base metal is used as a conductive material of the internal electrode layer, the internal electrode layer is oxidized when it is fired in the air. Thus, it is necessary to perform the cofiring of the dielectric layer and the internal electrode layer in a reducing atmosphere.

However, when the firing is performed in the reducing atmosphere, an insulation resistance is reduced since the dielectric layer is reduced. Therefore, a non-reducing dielectric material is proposed. However, a multilayer ceramic capacitor using non-reducing dielectric material had a problem of decrease in an insulation resistance (IR) by reliability test, when a thickness of a dielectric layer is made thin (5 μm or less).

Also, due to the rising demand for a temperature compensation dielectric ceramic composition having a small temperature change of the capacitance, namely, a capacitance temperature coefficient is small and possible to control arbitrarily within a range of −150 to +150 ppm/° C., there is a need for a ceramic composition which is available to provide such capacitor having controllable low temperature coefficient.

In order to meet such demand, in Patent Document 1 (WO2004/063119) discloses a dielectric ceramic composition comprises at least;

a main component including a dielectric oxide of the composition shown by

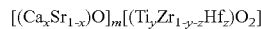

a first subcomponent including Mn oxide and/or Al oxide, and a glass component, wherein;

symbols m, x, y and z of compositional molar ratios included in said main component are in relation with;

$0.90 \leqq m \leqq 1.04$,
$0.5 \leqq x < 1$,
$0.01 \leqq y \leqq 0.10$, and
$0 < z \leqq 0.20$.

Further, according to Patent Document 1, Mn oxide may be added to said dielectric ceramic composition, and the amount thereof is 0.2 to 5 mol % in terms of MnO with respect to 100 mol % of the main component.

According to the dielectric ceramic composition of Patent Document 1, a non-reducing dielectric ceramic composition with a high reliability can be realized, which is preferably used as a dielectric layer of the multilayer ceramic capacitor using a base metal such as Ni or so as an internal electrode, possible to sinter at 1300° C. or lower, having a small temperature coefficient of the capacitance, possible to arbitrarily control within a range of −15 to +150 ppm/° C., having the insulation resistance $1 \times 10^{-13} \Omega$ or more at 25° C., having a small frequency dependency of a specific permittivity and dielectric loss tangent (tan δ), having a long acceleration life time of the insulation resistance even when a dielectric layer is made thin, and small defective ratio of the insulation resistance.

SUMMARY OF THE INVENTION

However, in a current situation wherein a compactness of the electronic component is progressing, there is a strong demanded to further make a dielectric layer thinner even in a multilayer ceramic capacitor. In the dielectric ceramic composition of the above mentioned Patent Document 1, there was no particular problem when forming thickness of 5 μm or so of the dielectric layer, however, when the thickness of the dielectric layer was 2 μm or less, the occurrences of cracks were found.

By investigating the cause, though it is not theoretically limiting, the present inventors have discovered the followings.

A main component of the dielectric ceramic composition of Patent Document 1 is $ABO_3$ type perovskite-like compound. Here, A site atom is too small (namely, m value is small) and when the added amount of Mn oxide is too much, it was found that one portion of B site atom seggregates as oxide. When the A site atom is reduced, in accordance with that, an amount of B site atom is limited. At this time, Mn oxide is added, B site atom is substituted with Mn. As a result, B site atom is exceeded, particularly Zr is segregated to the dielectric layer as $ZrO_2$. In case that the dielectric layer is thick, the crack did not occur since a volume change due to the segregated $ZrO_2$ was absorbed (buffered) by the thickness of the dielectric layer. However, as the dielectric layer became thin, the buffering effect of the dielectric layer is lowered, and as a result of the volume change due to the segregated $ZrO_2$, the crack occurred at the dielectric layer.

Further, a glass component is added to the dielectric ceramic composition of Patent Document 1 as sintering aids. The glass component melts at a relatively low temperature which is effective component for progressing the sintering at low temperature. However, a heterogeneous phase of the glass component origin is easily formed particularly at a lower temperature range. When the heterogeneous phase is formed, as a result of the volume change due to the heterogeneous phase, in some cases the crack may occur.

Therefore, there is a possibility to prevent the occurrence of the crack, if the compositional range in which $ZrO_2$ does not segregated even when Mn is solid dissolved in $[(CaSr)O]_m$

[(TiZrHf)O$_2$], which constitute the main component, and in which Mn is solid dissolved in B site, namely in [(CaSr)O]$_m$[(TiZrHfMn)O$_2$].

Also, there is a possibility to prevent the occurrence of the crack by using the sintering aids which acts at a higher temperature and difficult to form heterogeneous phases instead of the sintering aids of the glass type acting at a relatively lower temperature. The present inventors have reached to an idea of the following invention based on such discovery.

The present invention which solves the above problems include following matters as a gist.

[1] A dielectric ceramic composition comprising;
a main component including a dielectric oxide having a composition shown by $$[(Ca_{1-x}Sr_x)O]_m[(Zr_{1-y-z-\alpha}Ti_yHf_zMn_\alpha)O_2] \quad (2)$$

(note that, in a formula (2), m, x, y, z and α satisfy
$0.991 \leq m \leq 1.010$
$0 \leq x \leq 1$
$0 \leq y \leq 0.1$
$0 < z \leq 0.02$
$0.002 < \alpha \leq 0.05$),
0.1 to 0.5 parts by mol of Al$_2$O$_3$ and
0.5 to 5.0 parts by mol of SiO$_2$ with respect to 100 parts by mol of the main component.

[2] A manufacturing method for a dielectric ceramic composition comprising steps of;
preparing a first mixed powder by mixing CaCO$_3$, SrCO$_3$, ZrO$_2$, TiO$_2$ and HfO$_2$ in a ratio so that the total sum of the composition satisfies formula (1);

$$[(Ca_{1-x}Sr_x)O]_m[(Zr_{1-y-z}Ti_yHf_z)O_2] \quad (1)$$

(note that, in a formula (2), m, x, y and z fulfill
$0.993 \leq m \leq 1.055$
$0 \leq x \leq 1$
$0 \leq y \leq 0.1$
$0 < z \leq 0.02$),
a first heat treating step to obtain a first fired product by heat treating the first mixed powder at 1100 to 1300° C.,
preparing a second mixed powder by mixing a manganese compound in a ratio so that the total composition satisfy the composition of the dielectric oxide shown in formula (2) to the obtained first fired product and by further mixing
0.1 to 0.5 parts by mol of Al$_2$O$_3$ and,
0.5 to 5.0 parts by mol of SiO$_2$ with respect to 100 parts by mol of a dielectric oxide shown by a formula (2), $$[(Ca_{1-x}Sr_x)O]_m[(Zr_{1-y-z-\alpha}Ti_yHf_zMn_\alpha)O_2] \quad (2)$$

(note that, in the formula (2), m, x, y, z and α satisfy
$0.991 \leq m \leq 1.010$
$0 \leq x \leq 1$
$0 \leq y \leq 0.1$
$0 < z \leq 0.02$
$0.002 < \alpha \leq 0.05$), and
a second heat treating step to perform heat treatment the second mixed powder at 1150 to 1300° C.

[3] An electronic component comprising the dielectric layer, wherein;
said dielectric layer is constituted by the dielectric ceramic composition as set forth in [1].

[4] An electronic component having an internal electrode and a dielectric layer stacked in alternating manner, wherein;
said dielectric layer is constituted by the dielectric ceramic compound as set forth in [1].

[5] The electronic component as set forth in [4], wherein;
said internal electrode include at least Ni.

According to the present invention, the dielectric ceramic composition available to prevent the occurrence of the crack is provided even when a thickness of a dielectric layer is made thin, for example 2 μm or less, while having various advantageous properties of the dielectric ceramic composition of [(CaSr)O]$_m$[(TiZrHfMn)O$_2$] type.

BRIEF DESCRIPTION OF THE DRAWINGS

FIG. 1 The FIGURE shows a cross sectional view of a multilayer ceramic capacitor according to one embodiment of the present invention.

DESCRIPTION OF THE PREFERRED EMBODIMENTS

The present invention will be explained in detail in the following, based on the embodiment shown in the figures including the best mode thereof.

Multilayer Ceramic Capacitor

As shown in FIG. 1, a multilayer ceramic capacitor 1 as an electronic component according to an embodiment of the present invention comprises a capacitor element body 10 in which a dielectric layer 2 and an internal electrode layer 3 are stacked in alternating manner. At the both side ends of this capacitor element body 10, a pair of external electrode 4, which connects with each internal electrode alternately placed in the capacitor element body 10, is formed. Although, the shape of the capacitor element body 10 is not particularly limited, normally, it is a rectangular parallelepiped shape. The dimension thereof is not particularly limited and it can be suitably changed depending on the use, however usually it is (0.4 to 5.6 mm)×(0.2 to 5.0 mm)×(0.2 to 1.9 mm) or so.

The internal electrode layers 3 are stacked so that each end face is alternately exposed to the surface of the two opposed end portions of the capacitor element body 10. The pair of external electrode 4 is formed at both end portions of the capacitor element body 10, and connected with the exposed end faces of the alternately-stacked internal electrode layers 3 to constitute a capacitor circuit.

Dielectric Layer 2
(Dielectric Ceramic Composition)

The dielectric layer 2 comprises the dielectric ceramic composition of the present invention. The dielectric ceramic composition of the present invention comprises;
a main component including a dielectric oxide having a composition shown by $$[(Ca_{1-x}Sr_x)O]_m[(Zr_{1-y-z-\alpha}Ti_yHf_zMn_\alpha)O_2] \quad (2),$$

Al$_2$O$_3$ and SiO$_2$.

Note that, in a formula (2), symbols m, x, y, z and α showing a compositional molar ratio are in a relation of;
$0.991 \leq m \leq 1.010$, preferably, $0.995 \leq m \leq 1.005$,
$0 \leq x \leq 1$, preferably, $0 \leq x \leq 0.5$,
$0 \leq y \leq 0.1$, preferably, $0 \leq y \leq 0.05$,
$0 < z \leq 0.02$, preferably, $0 < z \leq 0.01$; and
$0.002 < \alpha \leq 0.05$, preferably, $0.005 \leq \alpha \leq 0.03$.

When a value of m in the compositional formula of the main component is too small, a frequency dependency of the capacitance and tan δ becomes larger, and ZrO$_2$ tends to be segregated. When it is too large, it tends to become difficult to fire at temperature of 1300° C. or lower.

Although a value of x in the compositional formula of the main component is not particularly limited, as it becomes larger, the frequency dependency of the capacitance and tan δ tend to become larger; and as it becomes smaller, a sintering property tends to decline. Therefore, it is preferable to select said preferable range upon considering the purpose of the dielectric property and the sintering property.

Also, although a lower limit of y in the compositional formula is not particularly limited, as it becomes smaller, the sintering property tends to decline. When it is too large, the frequency dependency of the capacitance and tan δ becomes larger, and the heterogeneous phase segregates and tends to cause the crack.

Further, when a value of z in the formula is too small, the sintering property tends to decline and the frequency dependency of the capacitance and tan δ tends to become larger. When it is too large, the heterogeneous phase segregates and tends to cause crack.

When a value of α in the compositional formula is too small, the sintering property tends to decline. When it is too large, $ZrO_2$ segregates and tends to cause crack.

The dielectric ceramic composition of the present invention includes said main component, $Al_2O_3$ and $SiO_2$. $Al_2O_3$ is included in a ratio of 0.1 to 0.5 parts by mol, preferably 0.1 to 0.3 parts by mol with respect to 100 parts by mol of said main component. Also, $SiO_2$ is included in a ratio of 0.5 to 5.0 parts by mol, preferably 1.0 to 2.0 parts by mol with respect to 100 parts by mol of said main component.

Also, when the added amounts of $Al_2O_3$ and $SiO_2$ are too little, the insulation resistance and the sintering property decline. When it is too large, the heterogeneous phase of aluminium or silicon origin segregates in the dielectric layers or between the layers which may cause the crack.

Further, in addition to the above mentioned components, various subcomponents may be blended into the dielectric ceramic composition of the present invention. Preferably, 0 to 2.5 parts by mol (note that 0 is not included), more preferably 0.5 to 2.5 parts by mol of V oxide in terms of $V_2O_5$ is included with respect to 100 parts by mol of said main component. By adding V oxide, IR acceleration life time can be improved. When the added amount thereof is too little, it tends to become hard to obtain the improving effect of the IR acceleration life time; and when it is too large, the sintering property tends to decline.

Also, preferably, 0.02 to 1.5 parts by mol, more preferably 0.10 to 1.0 parts by mol of at least one of rare earth elements including Sc and Y is included with respect to 100 parts by mol of the main component. Note that, in the rare earth elements, 17 elements constituted by lanthanides are included other than Sc, Y.

Also, preferably, 0.02 to 1.5 parts by mol, more preferably 0.10 to 1.0 parts by mol, of at least one of Nb, Mo, Ta, W and Mg is included with respect to 100 parts by mol of the main component. These elements may be comprised in the dielectric ceramic composition by combining with said rare earth elements. In this case, the total contents is preferably 0.02 to 1.5 parts by mol, more preferably 0.10 to 1.0 parts by mol, with respect to 100 parts by mol of said main component.

By adding these elements (including rare earth elements), the temperature coefficient of the capacitance and the frequency dependency of tan δ can be suppressed. When the added amount of these oxide are too little, the effect to suppress the temperature coefficient of the capacitance and the frequency dependency of tan δ tends to become difficult to obtain, when the added amount is too much, the sintering temperature tends to become high.

Note that, various conditions such as the number of the stacked layer and the thickness or so of the dielectric layer 2 shown in FIG. 1 can be determined suitably depending on the purpose or the usage. However, because the dielectric ceramic composition of the present invention can prevent the occurrence of the crack even when the dielectric layer is particularly thin, the thickness of the dielectric layer is preferably 1.0 to 3. 0um or so. Also, it is preferable that the dielectric layer 2 is constituted by a crystal grain and a grain boundary phase, and an average particle diameter of the crystal grain of the dielectric layer 2 is 1.0 μm or less.

(Manufacturing Method of the Dielectric Ceramic Composition)

A dielectric ceramic composition of the present invention can be obtained by; heat treating a first mixed powder comprising $CaCO_3$, $SrCO_3$, $ZrO_2$, $TiO_2$ and $HfO_2$ in a predetermined ratio at 1100 to 1300° C., to obtain a first fired body, then mixing manganese compound, $Al_2O_3$ and $SiO_2$ in a predetermined ratio to obtain a second mixed powder, and heat treating the second mixed powder at 1150 to 1300° C.

$CaCO_3$, $SrCO_3$, $ZrO_2$, $TiO_2$ and $HfO_2$ which are the materials of the first mixed powder are not particularly limited, and commercially available material powders are used. The grain properties of the material powders are preferably a fine particle in view of performing homogenous mixing and improving the reaction properties. The average particle diameters (D50) of each material is preferably within a range of 0.01 to 0.5 μm, more preferably 0.01 to 0.2 μm, further preferably, 0.01 to 0.05 μm, and BET specific surface area thereof is preferably 5 $m^2/g$ or more, further preferably 10 $m^2/g$ or more, particularly preferably 20 $m^2/g$ or more.

In order to obtain the first mixed powder, said material powders are mixed in a ratio so that the ratio of the metal atoms satisfy formula (1).

$$[(Ca_{1-x}Sr_x)O]_m[(Zr_{1-y-z}Ti_yHf_z)O_2] \tag{1}$$

Note that, in a formula (1), m, x, y and z satisfy
  $0.993 \leq m \leq 1.055$, preferably, $1.009 \leq m \leq 1.040$,
  $0 \leq x \leq 1$, preferably, $0 \leq x \leq 0.5$,
  $0 \leq y \leq 0.1$, preferably, $0 \leq y \leq 0.05$, and
  $0 < z \leq 0.02$, preferably, $0 < z \leq 0.01$.

A preparation method of the first mixed powder is not particularly limited, and an ordinal method such as wet method using a ball mill may be used. A first fired product can be obtained by drying the obtained first mixed powder then heat treating at predetermined conditions (a first heat treatment step).

A heat treatment temperature at the first heat treatment process is 1100 to 1300° C., preferably 1200 to 1300° C., further preferably 1220 to 1270° C., and it is reacted for a sufficient time for the above mentioned material powder to react, and to generate the first fired product having composition shown by said formula (1). Therefore, the heat treatment time depends on the heat treatment temperature and it is not particularly limited, however 1 to 4 hours or so is sufficient. A heat treatment atmosphere is not particularly limited, and it may be under air atmosphere, gas atmosphere such as nitrogen or so, or under reduced pressure or in vacuo.

When the heat treatment temperature is too high or the heat treatment time is too long, in some cases a giant particle is generated due to the particle growth of the material powder. When such giant particle is generated, it becomes difficult to make the finally obtained dielectric layer thin, thus, it is preferable to adopt a condition in which the first fired product having the average particle diameter (D50) of 0.2 to 0.5 μm or so is generated.

According to the above mentioned first heat treatment step, the first fired product can be obtained.

Next, the obtained first fired product, manganese compound, $Al_2O_3$ and $SiO_2$ are mixed in a predetermined ratio to obtain a second mixed powder.

Manganese compound is used in a ratio so that a total metal compositional ratio with the first fired product satisfies the dielectric oxide shown by said formula (2). As for the manganese compound, $MnCO_3$, $MnO_2$, $MnO_{3/2}$, and $MnO_{4/3}$ or so are used.

$Al_2O_3$ is used in a ratio of 0.1 to 0.5 parts by mol, preferably 0.1 to 0.3 parts by mol with respect to 100 parts by mol of the dielectric oxide shown by said formula (2).

$SiO_2$ is used in a ratio of 0.5 to 5.0 parts by mol, preferably 1.0 to 2.0 parts by mol with respect to 100 parts by mol of the dielectric oxide shown by said formula (2).

Manganese compound, $Al_2O_3$ and $SiO_2$ as the materials of the second mixed powder are not particularly limited, and commercially available material powders are used. The grain properties of the material powders are preferably a fine particle in view of performing a homogenous mixing and improving the reaction properties. The average particle diameters (D50) of each material is preferably within a range of 0.1 to 1.5 m, more preferably 0.1 to 1.0 µm, further preferably, 0.1 to 0.5 µm, and BET specific surface area thereof is preferably 10 $m^2$/g or more, further preferably 20 $m^2$/g or more, particularly preferably 30 $m^2$/g or more.

A preparation method of the second mixed powder is not particularly limited, and an ordinal method such as wet method using a ball mill may be used. The dielectric ceramic composition of the present invention can be obtained by drying the obtained second mixed powder, then heat treating at predetermined condition (a second heat treatment step).

A heat treatment temperature at the second heat treatment process is 1150 to 1300° C., preferably 1150 to 1250° C., further preferably 1150 to 1200° C. It is reacted for a sufficient time for the above mentioned material powder to react, and to generate the dielectric ceramic composition having the dielectric oxide of the composition shown by said formula (2) as the main component. Therefore, the heat treatment time depends on the heat treatment temperature and although it is not particularly limited, 1 to 4 hours or so is sufficient. A heat treatment atmosphere is not particularly limited, as mentioned below; it is preferable to fire under a reduced atmosphere when forming the dielectric layer of the multilayer ceramic capacitor having base metal such as Ni or so as the electrode layer.

In case of manufacturing the multilayer ceramic capacitor having the dielectric layer composed of the dielectric ceramic composition of the present invention, after preparing the second mixed powder, a binder and a vehicle are added to form a paste. A green sheet is produced by using the obtained paste, followed by forming a electrode paste layer. Then, by firing under said second heat treatment condition, the multilayer ceramic capacitor having dielectric layer composed of the dielectric ceramic compound of the present invention can be obtained. Details of the manufacturing of the green sheet and the multilayer ceramic capacitor will be specified later.

Internal Electrode Layer 3

The conducting material comprised in the internal electrode layer 3 are not particularly limited, however, since the material constituting the dielectric layer 2 has reduction resistance, base metals can be used. The base metals to be used as the conducting materials are preferably, Ni or Ni alloy. As for Ni alloy, the alloy made of Ni and one or more elements selected from Mn, Cr, Co, and Al is preferable, and the content of Ni in the alloy is preferably 95 wt % or more. Note that, Ni or the Ni alloy may contain 0.1 wt % or less or so of various trace component such as P, Fe, and Mg or so.

The thickness of the internal electrode layer 3 may be determined accordingly depending on the use or so; however, normally, it is preferably 0.5 to 5 µm, and particularly 1. to 2.5 µm or so is preferable.

External Electrode 4

The conducting material comprised in the external electrode 4 is not particularly limited; however, normally, Cu and Cu alloy or Ni, Ni alloy may be used. Note that, of course Ag or Ag—Pd alloy or so may be used. Note that, inexpensive Ni, Cu, or the alloy thereof may be used in the present embodiment. Although the thickness of the external electrode layer 4 can be determined accordingly depending on the use or so, normally, it is preferably 10 to 50 µm or so.

The Production Method of the Multilayer Ceramic Capacity

The multilayer ceramic capacitor using a dielectric ceramic composition of the present invention is produced by making the green chip by the standard printing method or the sheets method using the paste, followed by firing this to print or transfer the external electrodes. The following will explain the production method in detail.

First, a dielectric layer paste, an internal electrode layer paste and an external electrode layer paste are produced respectively.

Dielectric Layer Paste

The dielectric layer paste may be an organic paste kneaded with the dielectric material and the organic vehicle, or it may be a water-based paste.

The above mentioned first fired product, manganese compound, $Al_2O_3$ and $SiO_2$ and the subcomponents, which are added if need, are included in the dielectric material. The blending ratio of each compounds in the dielectric material is similar to said second mixed powder; and also these material powders may be suitably pulverized to be used.

The organic vehicle is obtained by dissolving the binder in the organic solvent. The binder used in the organic vehicle is not particularly limited, and may be properly selected from a variety of usual binders such as ethylcellulose and polyvinyl butyral or so. Also, the organic solvent used at this time is not particularly limited, and may be properly selected from a variety of organic solvents such as terpineol, butyl carbitol, acetone and toluene in accordance with a method used such as a printing method and sheet method.

Also, as for the water-based paste, an aqueous binder and dispersant are dissolved in the water. The aqueous binder is not particularly limited, and may be selected from polyvinyl alcohol, cellulose, aqueous acrylic resin, emulsion and etc.

Internal Electrode Paste, External Electrode Paste

The internal electrode layer paste is obtained by kneading the conducting materials consisting of the above mentioned various conducting metals and alloys or various oxides, organic metal compound and resinate, etc., which become the above-mentioned conducting materials after firing, with the above-mentioned organic vehicle. Also, an external electrode paste may be obtained as similar to the above-mentioned internal electrode layer paste.

The content of the organic vehicle of the above-mentioned each paste is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed.

When using the printing method, the dielectric paste and the internal electrode paste are printed on a substrate such as polyethylene terephthalate to form layers, and after cutting into a predetermined shape, a green chip is obtained by removing from the substrate. On the contrary to this, when using the sheet method, a green sheet is formed by using dielectric paste, and the internal electrode paste is printed thereon, then, these are stacked to form a green chip.

Next, this green chip is subject to the binder removal treatment and the firing.

Binder Removal Treatment

The binder removal treatment may be performed under a normal condition, when using base metals such as Ni or Ni alloy, temperature rising rate is 5 to 300° C./hour, more preferably 10 to 100° C./hour in air atmosphere, the holding temperature is preferably 180 to 400° C., more preferably 200 to 300° C. and the temperature holding time is 0.5 to 24 hours, more preferably to 20 hours.

Firing (Second Heat Treatment Step)

The firing atmosphere of the green chip can be suitably determined depending on the type of the conducting material in the internal electrode paste. However when using base metal such as Ni or Ni alloy as the conducting material, a reduced atmosphere is preferable and the oxygen partial pressure of the firing atmosphere is preferably $10^{-10}$ to 1 Pa, more preferably $10^{-7}$ to 1 Pa ($10^{-12}$ to $10^{-5}$ atm). When the oxygen partial pressure is too low, the conducting material of the internal electrode tends to have abnormal sintering which results in a breakage thereof. Also, if the oxygen partial pressure is too high, the internal electrode tends to be oxidized.

The holding temperature at the firing (the second heat treatment step) is, as mentioned above, preferably 1150 to 1300° C., more preferably 1150 to 1250° C. and further preferably 1150 to 1200° C. If the holding temperature is too low, the densification tends to become insufficient; and if the holding temperature is too high, the capacitance-temperature characteristics tends to deteriorate due to the breakage of the electrode caused by the abnormal sintering of the internal electrode layer or the dispersion of the constitution material of the internal electrode layer.

As for the other firing conditions, the temperature rising speed is preferably 50 to 500° C./hour, and more preferably 200 to 300° C./hour; the temperature holding time is preferably 0.5 to 8 hours, and more preferably 1 to 3 hours; the cooling speed is preferably 50 to 500° C./hour, and more preferably 200 to 300° C./hour, and the firing atmosphere is preferably a reduced atmosphere. As for the atmospheric gas, for example, wet mixed gas of $N_2$ and $H_2$ is preferably used.

In case that firing is performed in a reduced atmosphere, it is preferable to perform annealing (heat treatment) to the sintered body of the capacitor device body.

Annealing (Heat Treatment)

The annealing is a treatment for reoxidizing the dielectric layer and thereby the insulation resistance can be increased. The oxygen partial pressure in the annealing atmosphere is preferably $10^{-4}$ Pa or higher, more preferably 1 to $10^{-3}$ Pa ($10^{-5}$ to $10^{-8}$ atm). When the oxygen partial pressure is too low, the dielectric layer tends to be difficult to reoxidize. When the oxygen partial pressure is too high, the internal electrode layer 3 tends to be oxidized.

The holding temperature at the annealing is preferably 1150° C. or lower, and further preferably 500 to 1100° C. When the holding temperature is too low, the dielectric layer may not be sufficiently reoxidized, often resulting in deteriorating the insulation resistance and shortening the acceleration lifetime thereof. Also, when the holding temperature is too high, not only the internal electrode layer is oxidize which reduces the capacitance, but also it reacts with the dielectric body itself, which tend to deteriorate the capacitance-temperature characteristics, insulation resistance and acceleration lifetime thereof. Note that the annealing may only consist of a temperature rising step and a temperature falling step. In this case, the temperature holding time is zero, and the holding temperature is same as the maximum temperature.

Additional annealing conditions are; the temperature holding time of 0 to 20 hours and more preferably 6 to 10 hours, the cooling speed of preferably 50 to 500° C./hour and more preferably 100 to 300° C./hour, and as for the atmospheric gas at the annealing, a wet nitrogen gas is preferably used, for example.

Note that, as similar to the above mentioned firing, in the above-mentioned binder removal treatment and annealing, a wetter or so, may be used to wet the nitrogen gas and mixed gas. In this case, the water temperature is preferably 5 to 75° C. or so.

Also, these binder removal treatment, firing and annealing may be performed continuously or independently. When these are continuously performed, it is more preferable to change the atmosphere without cooling after the binder removal treatment, then the firing is performed by raising the temperature to the holding temperature at the time of the firing, followed by performing the cooling, and when the temperature reaches to the holding temperature of the annealing, the atmosphere is changed to perform the annealing treatment. On the other hand, when these are independently performed, with respect to the firing, it is preferable to raise the temperature to the holding temperature at the time of the binder removal treatment under nitrogen gas or wet nitrogen gas, then the temperature is kept for raising after changing the atmosphere, after cooling to the holding time of the annealing, it is preferable to continue the cooling after changing the atmosphere to nitrogen gas or wet nitrogen gas. Also, with respect to the annealing, the atmosphere may be changed after raising the temperature to the holding temperature under nitrogen gas atmosphere, or whole annealing process may be under nitrogen gas atmosphere.

Thus obtained capacitor fired body is then subject to end surface polishing, for example, by barrel-polishing or sand blasting, and the external electrode paste is printed or transferred thereon, followed by firing, so that the external electrode 4 is formed. The firing conditions of the external electrode paste are preferably, for example, under the wet-mixed gas of nitrogen gas and hydrogen gas, at 600 to 800° C., for 10 minutes to 1 hour or so. If needed, a covering layer (pad layer) may be formed on the surface of the external electrode 4 by plating or so.

Thus produced multilayer ceramic capacitor 1 of the present embodiment is mounted on the printed-circuit board, by soldering or so, to be used in variety of electronic devices.

Note that, the present invention is not limited to the above-mentioned embodiments and can be variously modified within the scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer having the above composition.

Hereinafter, the present invention will be described based on the further detailed examples, but the present invention is not limited to the examples.

EXAMPLE

First, as a starting material for producing a first mixed powder, material powders ($CaCO_3$, $SrCO_3$, $ZrO_2$, $TiO_2$, $HfO_2$) respectively having an average particle sizes of 0.1 to 1.5 μm were prepared.

After scaling these materials so as to become the composition after a first heat treatment step shown in Table 1 (a main component except for Mn), water was added as a medium to the material and mixed by a ball mill for 20 hours. Then, the material was dried and a dried product thereof (a first mixed powder) was heat treated at 1250° C. for 2 hours to obtain the first fired product (a first heat treatment step). Then, an obtained first fired product was wet pulverized by a ball mill and dried.

Next, after scaling the first fired product and the material powder ($MnCO_3$, $Al_2O_3$, $SiO_2$) having an average particle sizes of 0.1 to 1.5 μm so as to become the composition after a second heat treatment step shown in the following Table 1, water was added as a medium to the material and mixed by a ball mill for 5 hours. Then, this mixed product was dried and a second mixed powder was obtained.

100 parts by weight of thus obtained second mixed powder after drying, 4.8 parts by weight of acrylic resin, 40 parts by weight of methylene chloride, 20 parts by weight of ethyl acetate, 6 parts by weight of mineral spirit, and 4 parts by weight of acetone were mixed by a ball mill to form a paste and the dielectric layer paste was obtained.

Then, 100 parts by weight of Ni particles, 40 parts by weight of organic vehicle (8 part by weight of ethyl cellulose resin was dissolved in 92 parts by weight of butyl carbitol), 10 parts by weight of butyl carbitol were kneaded by triple rolls to form a paste and an internal electrode layer paste was obtained.

Then, 100 parts by weight of Cu particles, 35 parts by weight of organic vehicle (8 part by weight of ethyl cellulose resin was dissolved in 92 parts by weight of butyl carbitol), 7 parts by weight of butyl carbitol were kneaded to form a paste and an external electrode layer paste was obtained.

Then, by using the above-mentioned dielectric layer paste, a green sheet having a thickness of 2.5 μm was formed on a PET film, after printing the internal electrode layer paste on the green sheet, the green sheet was removed from the PET film. Then, the green sheets and protection green sheets (the internal electrode layer paste was not printed) were stacked and adhered by pressure to obtain a green stacking body. The number of stacked layers of the sheets having the internal electrode was 100 layers.

Also, a part from the above, by using the above-mentioned dielectric layer paste, a green sheet having the thickness of 6.5 μm was formed on a PET film, after printing the internal electrode layer paste on the green sheet, the green sheet was removed from the PET film. Then, the green sheets and protection green sheets (the internal electrode layer paste was not printed) were stacked and adhered by pressure to obtain a green stacking body. The number of stacked layers of a sheet having the internal electrode was 100 layers.

Then, the green stacking body was cut into a predetermined size to obtain a green chip. The obtained green chip was subject to the binder removal treatment, firing (a second heat treatment process) and reoxidation treatment (annealing) to obtain a multilayer ceramic fired body. The binder removal treatment was performed at the temperature rising rate: 30° C./hour, the holding temperature: 260° C., the temperature holding time: 8 hours, and the atmosphere: in the air. Also the firing (the second heat treatment step) was performed at the temperature rising speed: 200° C./hour, the holding temperature: shown in Table 2 and Table 3, the holding time: 2 hours, the cooling speed: 300° C./hour, the atmospheric gas: wet mixed gas of $N_2+H_2$ (the oxygen partial pressure was adjusted within a range of $1\times10^{-8}$ to $1\times10^{-6}$ Pa). The reoxidation treatment was performed at the holding temperature: 750° C., the temperature holding time: 2 hours, the cooling speed: 300° C./hour, the atmospheric gas: wet gas of $N_2$ (the oxygen partial pressure: $1\times10^{-2}$ to 1 Pa). Note that a wetter having a water temperature of 35° C. was used to wet the atmospheric gas at the firing and annealing.

After polishing end faces of the multilayer ceramic fired body with sandblast, the external electrode paste was transferred to the end faces, and fired at 800° C. for 10 minutes in wet gas of $N_2+H_2$ atmosphere to form external electrodes, then a sample of the multilayer ceramic capacitor having constitution shown in FIG. 1 was obtained. Then, Sn metallic plating film and Ni metallic plating film were formed on a surface of the external electrode to obtain a sample for measuring.

The size of thus obtained respective samples were 3.2 mm×1.6 mm×1.6 mm, the number of the dielectric layer sandwiched by the internal electrode layer was 100, the thickness of the internal electrode layer was 2 μm. Also, in case of using the green sheet having thickness of 2.5 μm, the thickness of the dielectric layer was 1.5 μm; and in case of using the green sheet having thickness of 6.5 μm, the thickness of the dielectric layer was 5.0 μm. Following properties were evaluated to the respective samples.

Specific Permittivity (∈r), Insulation Resistance (IR)

For capacitor samples, a capacitance was measured by digital LCR meter (4274A by YHP), at frequency of 1 kHz, input signal level (measured voltage) of 1 Vrms, at 25° C. was measured. Then, a specific permittivity (no unit) was calculated based on the obtained capacitance, the electrode size of capacitor samples and the distance between the electrodes.

Then, by using an insulation resistance meter (R8340A by Advantest), insulation resistance IR after applying DC50V at 25° C. for 60 seconds was measured. A result of the capacitor having the dielectric layer of a thickness of 1.5 μm is shown in Table 2. The result of the capacitor having the dielectric layer of a thickness of 5.0 μm is shown in Table 3.

Temperature Coefficient of Capacitance (τC)

For capacitor samples, by using LCR meter, a capacitance was measured at 1 kHz and 1V voltage and based on the capacitance at 25° C. (C25) and the capacitance at 125° C. (C125), the temperature coefficient of capacitance (τC) was calculated by the following formula. The results are shown in Table 2 and Table 3.

$$\tau C=\{(C125-C25)/C25\}\times(1/(125-25)$$

High Temperature Accelerated Lifetime (Accelerated Lifetime of Insulation Resistance)

For the capacitor samples, while applying the direct voltage of 70 V/μm at 200° C., a time in which the insulation resistance (LogIR) became 6 or less was measured as the high temperature accelerated lifetime. This high temperature accelerated lifetime was performed to 20 capacitor samples and evaluated by measuring an average lifetime. The results are shown in Table 2 and Table 3.

Average Particle Diameter

The sample was cut, then the cross section thereof was polished, and a chemical etching or thermal etching treatment was performed to the polishing face. Then, the crystal grain constituting the dielectric layer was observed by a scanning electron microscope, and the average particle diameter was calculated by the image analysis processing software. The results are shown in Table 2 and Table 3.

Number of Crack Occurrence

The appearances of 100 samples having the same composition were observed, and the numbers of the samples with the crack were counted. The results are shown in Table 2 and Table 3.

TABLE 1

| | compositional ratio after 1st heat treatment | | | | compositional ratio after 2nd heat treatment proces | | | | | | |
|---|---|---|---|---|---|---|---|---|---|---|---|
| | $[(Ca_{1-x}Sr_x)O]_m[(Zr_{1-y-z}Ti_yHf_z)O_2]$ (1) formula | | | | main component: $[(Ca_{1-x}Sr_x)O]_m[(Zr_{1-y-z-\alpha}Ti_yHf_zMn_\alpha)O_2]$ (2) formula | | | | | added amount with respect to 100 parts by mol of main component | |
| | | | | | | | | | | $Al_2O_3$ parts by | $SiO_2$ parts by |
| Sample No. | x | y | z | m | x | y | z | α | m | mol | mol |
| 1 | 0 | 0.03 | 0.01 | 1.014 | 0 | 0.03 | 0.01 | 0.02 | 0.994 | 0.2 | 1.5 |
| 2 | 1 | 0.03 | 0.01 | 1.014 | 1 | 0.03 | 0.01 | 0.02 | 0.994 | 0.2 | 1.5 |
| 3 | 0.3 | 0.03 | 0.01 | 1.014 | 0.3 | 0.03 | 0.01 | 0.02 | 0.994 | 0.2 | 1.5 |
| 4 | 0.3 | 0 | 0.01 | 1.014 | 0.3 | 0 | 0.01 | 0.02 | 0.994 | 0.2 | 1.5 |
| 5 | 0.3 | 0.1 | 0.01 | 1.014 | 0.3 | 0.1 | 0.01 | 0.02 | 0.994 | 0.2 | 1.5 |
| 6 | 0.3 | *0.15* | 0.01 | 1.014 | 0.3 | *0.15* | 0.01 | 0.02 | 0.994 | 0.2 | 1.5 |
| *7 | 0.3 | 0.1 | 0.01 | 1.010 | 0.3 | 0.1 | 0.01 | 0.02 | *0.990* | 0.2 | 1.5 |
| 8 | 0.3 | 0.1 | 0.01 | 1.019 | 0.3 | 0.1 | 0.01 | 0.02 | 0.999 | 0.2 | 1.5 |
| 9 | 0.3 | 0.1 | 0.01 | 1.030 | 0.3 | 0.1 | 0.01 | 0.02 | 1.010 | 0.2 | 1.5 |
| *10 | 0.3 | 0.1 | 0.01 | 1.040 | 0.3 | 0.1 | 0.01 | 0.02 | *1.020* | 0.2 | 1.5 |
| *11 | 0.3 | 0.03 | *0* | 1.014 | 0.3 | 0.03 | *0* | 0.02 | 0.994 | 0.2 | 1.5 |
| 3 | 0.3 | 0.03 | 0.01 | 1.014 | 0.3 | 0.03 | 0.01 | 0.02 | 0.994 | 0.2 | 1.5 |
| 12 | 0.3 | 0.03 | 0.02 | 1.014 | 0.3 | 0.03 | 0.02 | 0.02 | 0.994 | 0.2 | 1.5 |
| *13 | 0.3 | 0.03 | *0.03* | 1.014 | 0.3 | 0.03 | *0.03* | 0.02 | 0.994 | 0.2 | 1.5 |
| *14 | 0.3 | 0.03 | 0.01 | 0.994 | 0.3 | 0.03 | 0.01 | *0* | 0.994 | 0.2 | 1.5 |
| *15 | 0.3 | 0.03 | 0.01 | 0.995 | 0.3 | 0.03 | 0.01 | *0.001* | 0.994 | 0.2 | 1.5 |
| 16 | 0.3 | 0.03 | 0.01 | 0.997 | 0.3 | 0.03 | 0.01 | 0.003 | 0.994 | 0.2 | 1.5 |
| 3 | 0.3 | 0.03 | 0.01 | 1.014 | 0.3 | 0.03 | 0.01 | 0.02 | 0.994 | 0.2 | 1.5 |
| 17 | 0.3 | 0.03 | 0.01 | 1.044 | 0.3 | 0.03 | 0.01 | 0.05 | 0.994 | 0.2 | 1.5 |
| *18 | 0.3 | 0.03 | 0.01 | 1.054 | 0.3 | 0.03 | 0.01 | *0.06* | 0.994 | 0.2 | 1.5 |
| *19 | 0.3 | 0.03 | 0.01 | 1.014 | 0.3 | 0.03 | 0.01 | 0.02 | 0.994 | *0* | 1.5 |
| 20 | 0.3 | 0.03 | 0.01 | 1.014 | 0.3 | 0.03 | 0.01 | 0.02 | 0.994 | 0.1 | 1.5 |
| 21 | 0.3 | 0.03 | 0.01 | 1.014 | 0.3 | 0.03 | 0.01 | 0.02 | 0.994 | 0.5 | 1.5 |
| *22 | 0.3 | 0.03 | 0.01 | 1.014 | 0.3 | 0.03 | 0.01 | 0.02 | 0.994 | *0.6* | 1.5 |
| *23 | 0.3 | 0.03 | 0.01 | 1.014 | 0.3 | 0.03 | 0.01 | 0.02 | 0.994 | 0.2 | *0* |
| *24 | 0.3 | 0.03 | 0.01 | 1.014 | 0.3 | 0.03 | 0.01 | 0.02 | 0.994 | 0.2 | *0.4* |
| 25 | 0.3 | 0.03 | 0.01 | 1.014 | 0.3 | 0.03 | 0.01 | 0.02 | 0.994 | 0.2 | 3 |
| 26 | 0.3 | 0.03 | 0.01 | 1.014 | 0.3 | 0.03 | 0.01 | 0.02 | 0.994 | 0.2 | 5 |
| *27 | 0.3 | 0.03 | 0.01 | 1.014 | 0.3 | 0.03 | 0.01 | 0.02 | 0.994 | 0.2 | 6 |

TABLE 2

Thickness between electrode layers 1.5 μm

| Sample No. | firing temp. [° C.] | specific permittivity ε r | insulation resistance LogIR [Ω] | capacitance temperature coefficient τ C [ppm/° C.] | acceleration life time [hr] | crystal particle diameter [μm] | crack occurrence number/ 100 samples |
|---|---|---|---|---|---|---|---|
| 1 | 1250 | 31 | 14.1 | +4 | 120 | 0.5 | 0/100 |
| 2 | 1220 | 40 | 13 | +25 | 85 | 0.7 | 0/100 |
| 3 | 1230 | 33 | 13.4 | +1 | 115 | 0.6 | 0/100 |
| 4 | 1230 | 32 | 13.5 | +28 | 105 | 0.6 | 0/100 |
| 5 | 1220 | 34 | 13.1 | −20 | 100 | 0.7 | 0/100 |
| *6 | 1220 | 35 | 13 | −33 | 85 | 0.8 | 1/100 |
| *7 | 1220 | 34 | 12.5 | +5 | 79 | 1.2 | 2/100 |
| 8 | 1230 | 34 | 13.5 | +2 | 115 | 0.6 | 0/100 |
| 9 | 1250 | 34 | 13.4 | +1 | 102 | 0.6 | 0/100 |
| *10 | 1280 | 33 | 12.9 | +1 | 76 | 0.5 | 7/100 |
| *11 | 1270 | 32 | 12.5 | −1 | 70 | 1.1 | 13/100 |
| 3 | 1230 | 33 | 13.4 | +1 | 115 | 0.6 | 0/100 |
| 12 | 1230 | 33 | 13.4 | +2 | 112 | 0.6 | 0/100 |
| *13 | 1220 | 34 | 13.2 | +5 | 93 | 0.8 | 1/100 |
| *14 | 1320 | 33 | 11.8 | +3 | 51 | 1.3 | 24/100 |
| *15 | 1280 | 33 | 12.5 | +5 | 65 | 0.5 | 2/100 |
| 16 | 1250 | 33 | 12.9 | +3 | 82 | 0.5 | 0/100 |
| 3 | 1230 | 33 | 13.4 | +1 | 115 | 0.6 | 0/100 |
| 17 | 1210 | 33 | 13.3 | −5 | 98 | 0.7 | 0/100 |
| *18 | 1200 | 33 | 13.1 | −10 | 75 | 0.9 | 3/100 |
| *19 | 1280 | 33 | 12.9 | +2 | 95 | 0.6 | 1/100 |
| 20 | 1260 | 33 | 13.2 | +1 | 112 | 0.6 | 0/100 |
| 21 | 1230 | 32 | 13.1 | +2 | 101 | 0.7 | 0/100 |
| *22 | 1220 | 32 | 12.5 | +5 | 70 | 1 | 5/100 |
| *23 | 1350 | 32 | 11.1 | +6 | 24 | 1.5 | 35/100 |
| *24 | 1280 | 32 | 12.8 | +2 | 85 | 0.5 | 6/100 |
| 25 | 1210 | 32 | 13.1 | +3 | 98 | 0.6 | 0/100 |

TABLE 2-continued

| | | | | Thickness between electrode layers 1.5 μm | | | |
|---|---|---|---|---|---|---|---|
| Sample No. | firing temp. [° C.] | specific permittivity ε r | insulation resistance LogIR [Ω] | capacitance temperature coefficient τ C [ppm/° C.] | accelaration life time [hr] | crystal particle diameter [μm] | crack occurrence number/ 100 samples |
| 26 | 1190 | 32 | 13.1 | +5 | 87 | 0.7 | 0/100 |
| *27 | 1180 | 31 | 12.7 | +10 | 71 | 0.9 | 2/100 |

TABLE 3

| | | | | Thickness between electrode layers 5 μm | | | |
|---|---|---|---|---|---|---|---|
| Sample No. | firing temp. [° C.] | specific permittivity ε r | insulation resistance LogIR [Ω] | capacitance temperature coefficient τ C[ppm/° C.] | accelaration life time [hr] | crystal particle diameter[μm] | crack occurrence number/ 100 samples |
| 1 | 1250 | 31 | 14.6 | +4 | 540 | 0.5 | 0/100 |
| 2 | 1220 | 40 | 13.5 | +25 | 383 | 0.7 | 0/100 |
| 3 | 1230 | 33 | 13.9 | +1 | 518 | 0.6 | 0/100 |
| 4 | 1230 | 32 | 14.0 | +28 | 473 | 0.6 | 0/100 |
| 5 | 1220 | 34 | 13.6 | −20 | 450 | 0.7 | 0/100 |
| *6 | 1220 | 35 | 13.5 | −33 | 383 | 0.8 | 0/100 |
| *7 | 1220 | 34 | 13.0 | +5 | 356 | 1.2 | 0/100 |
| 8 | 1230 | 34 | 14.0 | +2 | 518 | 0.6 | 0/100 |
| 9 | 1250 | 34 | 13.9 | +1 | 459 | 0.6 | 0/100 |
| *10 | 1280 | 33 | 13.4 | +1 | 342 | 0.5 | 0/100 |
| *11 | 1270 | 32 | 13.0 | −1 | 315 | 1.1 | 0/100 |
| 3 | 1230 | 33 | 13.9 | +1 | 518 | 0.6 | 0/100 |
| 12 | 1230 | 33 | 13.9 | +2 | 504 | 0.6 | 0/100 |
| *13 | 1220 | 34 | 13.7 | +5 | 419 | 0.8 | 0/100 |
| *14 | 1320 | 33 | 12.2 | +3 | 230 | 1.3 | 0/100 |
| *15 | 1280 | 33 | 13.0 | +5 | 293 | 0.5 | 0/100 |
| 16 | 1250 | 33 | 13.4 | +3 | 369 | 0.5 | 0/100 |
| 3 | 1230 | 33 | 13.9 | +1 | 518 | 0.6 | 0/100 |
| 17 | 1210 | 33 | 13.8 | −5 | 441 | 0.7 | 0/100 |
| *18 | 1200 | 33 | 13.6 | −10 | 338 | 0.9 | 0/100 |
| *19 | 1280 | 33 | 13.4 | +2 | 428 | 0.6 | 0/100 |
| 20 | 1260 | 33 | 13.7 | +1 | 504 | 0.6 | 0/100 |
| 21 | 1230 | 32 | 13.6 | +2 | 455 | 0.7 | 0/100 |
| *22 | 1220 | 32 | 13.0 | +5 | 315 | 1 | 0/100 |
| *23 | 1350 | 32 | 11.5 | +6 | 108 | 1.5 | 0/100 |
| *24 | 1280 | 32 | 13.3 | +2 | 383 | 0.5 | 0/100 |
| 25 | 1210 | 32 | 13.6 | +3 | 441 | 0.6 | 0/100 |
| 26 | 1190 | 32 | 13.6 | +5 | 392 | 0.7 | 0/100 |
| *27 | 1180 | 31 | 13.2 | +10 | 320 | 0.9 | 0/100 |

Note that, in Tables 1 to 3, sample numbers with * indicates the sample numbers which exceeded the range defined in the present invention. It is the same for the other tables. Also, with respect to sample 3, in order to make the comparison easier, it is re-recorded between the sample 11 and 12 as well as between the sample 16 and 17. Further, italics show the numerical values which exceed the range defined in the present invention.

As shown in Table 2 and Table 3, according to a dielectric ceramic composition which fulfills the requirement of the present invention, it was confirmed that the occurrences of the crack were suppressed even when the dielectric layer was made thin.

COMPARATIVE EXAMPLE

In the above example, when preparing the second mixed powder, the same operation was performed except for adding [(Ba$_{0.6}$Ca$_{0.4}$)O]SiO$_2$ as a glass component so as to be 1.5 parts by mol instead of SiO$_2$ with respect to 100 mol of the main component.

The added amount of the main component composition and the added component are shown in Table 4 and the results are shown in Table 5 and Table 6.

TABLE 4

| | compositional ratio after 1st heat treatment $[(Ca_{1-x}Sr_x)O]_m[(Zr_{1-y-z}Ti_yHf_z)O_2]$ (1) formula | | | | main component: $[(Ca_{1-x}Sr_x)O]_m[(Zr_{1-y-z-\alpha}Ti_yHf_zMn_\alpha)O_2]$ (2) formula | | | | | compositional ration after 2nd heat treatment added amount with respect to 100 parts by mol of main comonent $Al_2O_3$ parts by mold | $SiO_2$ parts by mol | Remarks glass additive | added amount of glass compound |
|---|---|---|---|---|---|---|---|---|---|---|---|---|---|
| Sample No. | x | y | z | m | x | y | z | α | m | | | | |
| *28 | 1 | 0.03 | 0.01 | 1.014 | 1 | 0.03 | 0.01 | 0.02 | 0.994 | 0.2 | — | $(Ba_{0.6}Ca_{0.4})SiO_3$ | 1.5 mol |
| *29 | 0.3 | 0.03 | 0.01 | 1.014 | 0.3 | 0.03 | 0.01 | 0.02 | 0.994 | 0.2 | — | $(Ba_{0.6}Ca_{0.4})SiO_3$ | 1.5 mol |
| *30 | 0.3 | 0 | 0.01 | 1.014 | 0.3 | 0 | 0.01 | 0.02 | 0.994 | 0.2 | — | $(Ba_{0.6}Ca_{0.4})SiO_3$ | 1.5 mol |
| *31 | 0.3 | 0.1 | 0.01 | 1.019 | 0.3 | 0.1 | 0.01 | 0.02 | 0.999 | 0.2 | — | $(Ba_{0.6}Ca_{0.4})SiO_3$ | 1.5 mol |
| *32 | 0.3 | 0.1 | 0.01 | 1.030 | 0.3 | 0.1 | 0.01 | 0.02 | 1.010 | 0.2 | — | $(Ba_{0.6}Ca_{0.4})SiO_3$ | 1.5 mol |

TABLE 5

Thickness between electrode layers 1.5 μm

| Sample No. | firing temp. [° C.] | specific permittivity εr | insulation resistance LogIR [Ω] | capacitance temperature coefficient τC. [ppm/° C.] | acceralation life time [hr] | crystal particle diameter [μm] | crack occurrence number/ 100 samples |
|---|---|---|---|---|---|---|---|
| *28 | 1230 | 38 | 13.1 | +22 | 68 | 0.7 | 4/100 |
| *29 | 1240 | 32 | 13.3 | +1 | 92 | 0.6 | 2/100 |
| *30 | 1240 | 31 | 13.4 | +27 | 84 | 0.6 | 5/100 |
| *31 | 1240 | 33 | 13.4 | +3 | 92 | 0.6 | 7/100 |
| *32 | 1260 | 32 | 13.2 | +2 | 82 | 0.6 | 10/100 |

TABLE 6

Thickness between electrode layers 5.0 μm

| Sample No. | firing temp. [° C.] | specific permittivity εr | insulation resistance LogIR [Ω] | capacitance temperature coefficient τC [ppm/° C.] | acceralation life time [hr] | crystal particle diameter [μm] | crack occurrence number/ 100 samples |
|---|---|---|---|---|---|---|---|
| *28 | 1230 | 38 | 13.1 | +22 | 306 | 0.7 | 0/100 |
| *29 | 1240 | 32 | 13.3 | +1 | 414 | 0.6 | 0/100 |
| *30 | 1240 | 31 | 13.4 | +27 | 378 | 0.6 | 0/100 |
| *31 | 1240 | 33 | 13.4 | +3 | 414 | 0.6 | 0/100 |
| *32 | 1260 | 32 | 13.2 | +2 | 367 | 0.6 | 0/100 |

As shown in Table 5 and Table 6, when the glass component was mixed instead of $SiO_2$, the occurrences of the cracks can be suppressed, when the dielectric layer was thick; and the cracks were found, when the dielectric layer became thin.

What is claimed:

1. A dielectric ceramic composition consisting of:
   a main component including a dielectric oxide having a composition shown by $$[(Ca_{1-x}Sr_x)O]_m[(Zr_{1-y-z-\alpha}Ti_yHF_zMn_\alpha)O_2] \quad (2)$$

wherein m, x, y, z and α satisfy:
   $0.991 \leq m \leq 1.010$;
   $0 \leq x \leq 1$;
   $0 \leq y \leq 0.1$;
   $0 < z \leq 0.02$;
   $0.002 < \alpha \leq 0.05$;
   0.1 to 0.5 parts by mol of $Al_2O_3$; and
   0.5 to 5.0 parts by mol of $SiO_2$ with respect to 100 parts by mol of the main component, wherein said $SiO_2$ is not a glass component.

2. An electronic component comprising a dielectric layer, wherein said dielectric layer is constituted by the dielectric ceramic composition as set forth in claim 1.

3. An electronic component having an internal electrode and a dielectric layer stacked in alternating manner, wherein said dielectric layer is constituted by the dielectric ceramic composition as set forth in claim 1.

4. The electronic component as set forth in claim 3, wherein said internal electrode includes at least Ni.

* * * * *